United States Patent [19]
Barron et al.

[11] 3,818,756
[45] June 25, 1974

[54] LOAD PROFILE ANALYZER IN THE ATTACHED SPECIFICATION

[75] Inventors: Edward R. Barron, 20 Ruth Dr., Framingham, Mass. 01701; Stanley D. Tanenholtz, Southboro, Mass.

[73] Assignee: said Barron, by said Tanenholtz

[22] Filed: Sept. 7, 1971

[21] Appl. No.: 178,017

[52] U.S. Cl. .................................. 73/172, 73/159
[51] Int. Cl. ............................................ A41h 1/00
[58] Field of Search .................... 73/172, 159, 133; 200/159 B, 159 R, DIG. 2

[56] References Cited
UNITED STATES PATENTS 2,378,039  6/1945  Schenker ............................ 73/172
3,098,141  7/1963  Wintriss ........................... 200/159 B
3,503,257  3/1970  McElhaney ........................... 73/159

FOREIGN PATENTS OR APPLICATIONS
164,450  12/1964  U.S.S.R. ............................ 73/172

Primary Examiner—Richard C. Queisser
Assistant Examiner—Denis E. Corr
Attorney, Agent, or Firm—John E. Toupal

[57] ABSTRACT

Disclosed is a load profile analyzer for measuring and indicating static and dynamic loads exerted upon different areas of the human body by objects in contact therewith. A plurality of pressure sensors are suspended in predetermined positions with respect to the body by a support and the pressures sensed are indicated by a display.

21 Claims, 13 Drawing Figures

Edward R. Barron
Stanley D. Tanenholtz
INVENTORS.

John E. Toupal
ATTORNEY.

Edward R. Barron
Stanley D. Tanenholtz
INVENTORS.
John E. Toupal
ATTORNEY.

PATENTED JUN 25 1974

Edward R. Barron
Stanley D. Tanenholtz
INVENTORS.

John E. Toupal
ATTORNEY.

LOAD PROFILE ANALYZER IN THE ATTACHED SPECIFICATION

BACKGROUND OF THE INVENTION

The invention described herein may be manufactured, used and licensed by or for the Government for Governmental purposes without the payment to us of any royalty thereon.

This invention relates to pressure sensors and more particularly to a system for quantitatively measuring and analyzing distribution characteristics of loads induced by objects in contact with the body of a test subject.

Pressure sensitivity is not uniform for all portions of the human body. Often a proper fit and proper load distribution with respect to these different sensitivities is important. For example, aircrew armor used by the military services weighs approximately 25 lbs., and improper fit may cause that weight to be carried predominantly on the wearer's shoulders. The arteries supplying blood to the brain are in the back of the shoulders and high pressure thereon may restrict the flow of blood through these arteries causing dizziness, shaking, nausea or general impairment of motor function. The problem also exists in environments unrelated to the armed services. For example, sport parachuting harnesses, football helmets and ski boots all must fit tightly and therefore correct load distribution is important. Further examples of items in which correct load distribution is a factor in design and fit include objects of wearing apparel such as ladies foundation garments. Obviously, custom made garments or surgical supports also must fit correctly. Currently, modifications directed toward improving fit and load distribution are accomplished by trail and error. Such a system does not yield an optimum design. Only subjective opinions from a limited number of people can be obtained and these are not always reliable or reproducible, and sometimes it is difficult to obtain any credible opinion, as for example, when dealing with children's garments or shoes.

Systems to measure load profiles exerted on the human body have been sugested, but none has met with wide acceptance because of various deficiencies. For example, one such system included a plurality of pneumatic bladders with electrical contacts therein for detecting load thresholds. The bladders required both electrical and pneumatic connections, rendering the system bulky and cumbersome and subject inaccurate readings due to pinching and kinking of the air tubes. In addition, since all the sensors were connected to a comoon pressure source, different loads could not be detected simultaneously. Another known system comprises a plurality of sensors disposed on a portion of a mannequin that receives a test garment. Circuit connections are inside the model and simultaneous readings of different pressures are made. However, in this system only a static test is provided with no indication of variations in load distribution that would accompany normal movement of an actual subject.

The object of this invention therefore, is to provide a system that can measure and indicate force fields exerted on an individual by various objects while he is in either a static position or exercising the movements associated with normal activities. The system should offer no substantial restriction to motions of the test subject and be capable of simultaneously detecting and indicating varying load levels exerted on different areas of the body.

SUMMARY OF THE INVENTION

This invention is characterized by a plurality of sensors supported in predetermined positions with respect to the body of a test subject to sense the forces exerted on the body by an article in contact therewith. An analyzer is operatively coupled to the sensors to analyze and indicate the pressures sensed thereby.

One feature of the invention is the utilization of sensors and an analyzer that are operated electrically. Electrical sensors respond quickly to any change in pressure and are not subject to errors caused by restrictions in an air tube, as are pneumatic bladders. Furthermore, electrical sensors are small and readily available in various types that enhance system versitility. For example, a progressive contact switch catagorizes the pressure sensed as falling within one of a plurality of predetermined pressure ranges. Progressive contact switches are inexpensive and rugged. Other examples of electrical sensors are variable inductance sensors or piezoelectric sensors, both of which measure a continuum of pressure rather than quantized ranges. Because of their versitility, electrical sensors of different sensitivity can be combined, with the sensors designed to measure the highest pressure disposed on the fleshier, less sensitive parts of the body on which highest pressures can be more comfortably accommodated.

Another feature of the invention is a plurality of indicators, each one operatively associated with one of the plurality of sensors. A field with a plurality of indicators quickly shows any pattern in the load profile, and allows the load profile of the entire body or a large portion thereof to be viewed simultaneously.

Yet another feature of the invention is the dynamic mode of operation provided by the analyzer and the recording indicators. The dynamic mode of operation provides continuous monitoring of pressures sensed as those pressures change while a subject goes through the motions associated with his normal activities. Recording indicators record the varying pressures as the subject changes position, thereby permitting later study of changes produced in the load profile during motion.

Still another feature of the invention is a memory in the analyzer that will store a given set of pressures for careful and complete analysis without the necessity of the subject remaining stationary.

Yet another feature of the invention is a peaking circuit in the analyzer that provides an indication of the maximum pressure sensed during any given test. Some persons go through complex and varied motions during their work, and, when considering optimum design of their apparel and associated equipment, the maximum pressures exerted on them during the cycle of their movements can be of more interest than average or normally applied pressure. The peaking circuit allows easy identification of area subjected to high pressures at any time.

A further feature of the invention is its usefullness for measuring load distributions produced by a wide variety of objects. For example, a skull cap with sensors thereon may be used when analyzing the load profile of head gear such as helmets, and a vest may be used to analyze pressures on the torso. Footwear may be checked with a support in the form of a stocking. Such special supports formed for particular parts of the human body permit easily repeatable measurements to be rapidly made. Another support used is a large flexible sheet with a matrix of sensors fixed thereto. Such a support allows faster measurement of load profiles exerted on the body by articles other than clothing. For example, when designing furniture the sheet is placed on a proposed design and when a subject simulates use of the furniture the force pattern is seen and analyzed. More uniform load distribution and therefore added comfort may be designed into an article of furniture.

Still another feature of the invention is a display that simulates the portion of the body being tested. A form of this may be a mannequin of a human torso with a plurality of indicators, for example colored lights, mounted thereon. Any three dimensional form corresponding to the support being used may be employed, that is models of a head, torso and a foot correspond to a skull cap, vest and stocking respectively. Each indicator is affixed in the same relative position on the display as the associated sensor is disposed on the support. Two dimensional silhouettes may be used equally effectively. Patterns in the load profile are easier to visualize and analyze when viewed as they actually appear on a particular part of the human body, and corrections are more easily made.

Another feature of the invention is the disposition of the plurality of sensors in a fixed matrix on the support. The regular pattern obtained with a fixed matrix renders the load profile easier to analyze and interpret, and insures even coverage of the subject area. In addition, an orderly coordinate system is provided to identify corresponding sensors and indicators.

A further feature of the invention is the utilization of replaceable sensors in a matrix support. The sensors may be damaged as the support is donned and doffed repeatedly, but sensors that can be quickly replaced eliminate time loss that might otherwise be incurred when the system is needed. Also, the sensitivity of a given matrix support can be easily modified by substitution of suitable sensors.

Still a further feature of the invention is a suspension that suspends the support so that the weight of the apparatus itself does not affect the reading. The sensors are very sensitive and it is therefore important that no extraneous forces be imposed thereon.

Yet other features of the invention are a stretchable liner used in the support and flexible printed circuits used to interconnect the sensors. The flexible liner and circuits allow the subject to exercise motions normally associated with his activities with little or no impairment. In addition, the stretchable character of the liner permits a single garment to be used on people of different sizes.

A further feature is a stretchable envelope covering the sensors, thereby protecting them from damage and dirt. The reliability and life of the system is thereby enlarged.

DESCRIPTION OF THE DRAWINGS

These and other features and objects will become more apparent upon a perusal of the following description taken in conjunction with the accompanying drawings wherein.

DESCRIPTION OF THE PREFERRED EMBODIMENTS

Figure 1:
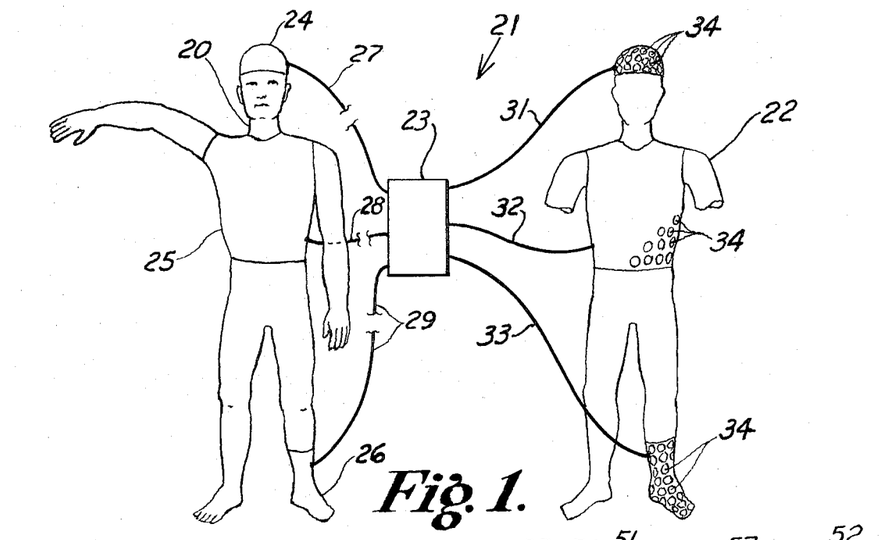
FIG. 1 is a diagram of a preferred embodiment of the invention.

Referring first to FIG. 1, there is shown one preferred embodiment 21 of the invention including a display 22 and an analyzer 23 connected to a plurality of sensor garments 24, 25 and 26. The sensor garments 24, 25 and 26 as shown in FIG. 1 include a skull cap (24), a vest (25) and a stocking (26) and are worn by a test subject 20. The sensor garments 24, 25 and 26 include a plurality of pressure sensors on a support as described below and are connected to the analyzer 23 by cables 27, 28 and 29 respectively. Other cables 31, 32 and 33 connect the analyzer 23 to the display 22. A plurality of indicator lights 34 are disposed on the display 22 which is a model of a man. Each indicator 34 is associated with a sensor in one of the sensor garments 24, 25 or 26, and is disposed on the display 22 in the same position as the associated sensor is supported on the test subject 20.

Figure 2:
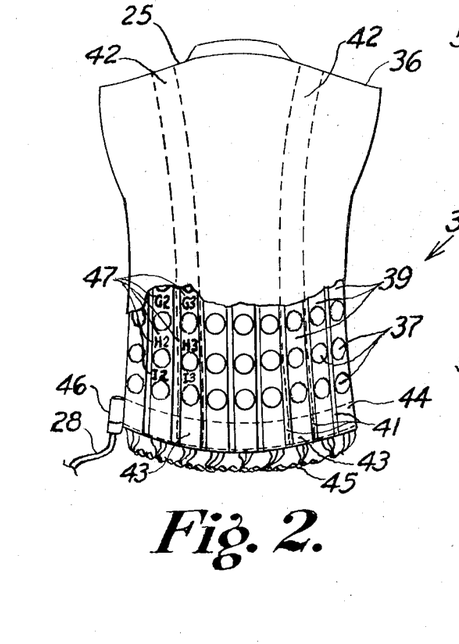
FIG. 2 shows an embodiment utilizing a vest support, with an envelope displaced to expose sensors and wiring.

Referring now to FIG. 2 there is shown a drawing of the sensor garment 25. Normally a stretchable envelope 36 covers the entire garment 25 protecting it from snags and excluding dirt therefrom without creating any mechanical coupling between individual sensors. A portion of the envelope 36 has been removed to reveal some of the individual sensors 37 as they are mounted on a support system 38 that includes flexible circuit strips 39 that are formed on an insulating plastic substrate. The circuit strips 39 are joined by stretchable liner strips 41 that comprise part of the support system 38. The stretchable and flexible liner strips 41 and the flexible circuit strips 39 permit the sensors to move with respect to each other and facilitate use of the sensor garment 25 on test subjects 20 of different sizes. Shown in phantom in FIG. 2 are two suspension straps 42 that are beneath the support system 38. Fixed at the lower ends 43 of the suspension straps 42 is a suspension band 44 that carries a wiring harness 45 and a holster plug 46. The suspension straps 42 support the wiring harness 45 directly on the body of the test subject 20, thereby assuring that the weight of the harness 45 and holster 46 is not reflected in the pressures sensed. Connected to the holster plug 46 is the cable 28 that connects the sensing garment 25 to the analyzer 23. Indicia 47 on the circuit strips 39 shows the coordinate positions of the sensors 37.

Figure 3:
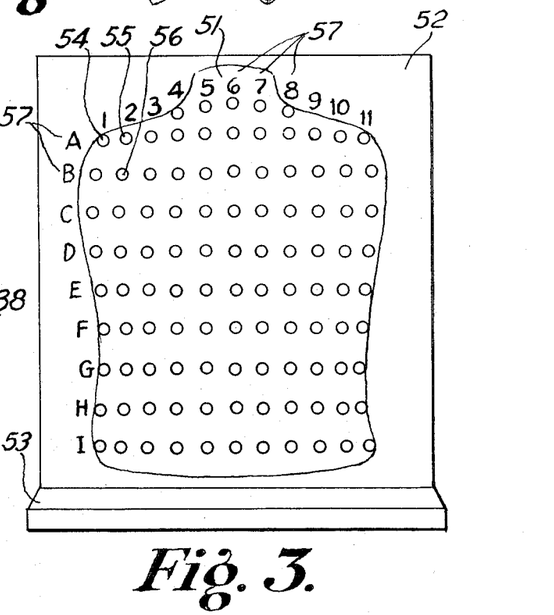
FIG. 3 shows one form of display that may be used to indicate the force fields on the back of a test subject.

Referring now to FIG. 3 there is shown an alternate display board 52, that is mounted on a base 53. The board 52 supports a plurality of Tri-A-Lite indicators 54, 55, 56 etc. A Tri-A-Lite is a small enclosure containing three different colored light bulbs that can be illuminated independently. Inscribed on the display board 52 are characters 57 to identify each of the indicators 54, 55, 56 etc. During operation and evaluation the indicators may then be identified singularly, for example, the indicator 54 is A1, and the indicator 56 is B2. The simulation of a human back 51 may be either three dimensional, as a section cut out of a mannequin, or two dimensions as a silhouette drawing. Any other portion of the human anatomy may be similarly simulated.

Figures 4, 5, 6:
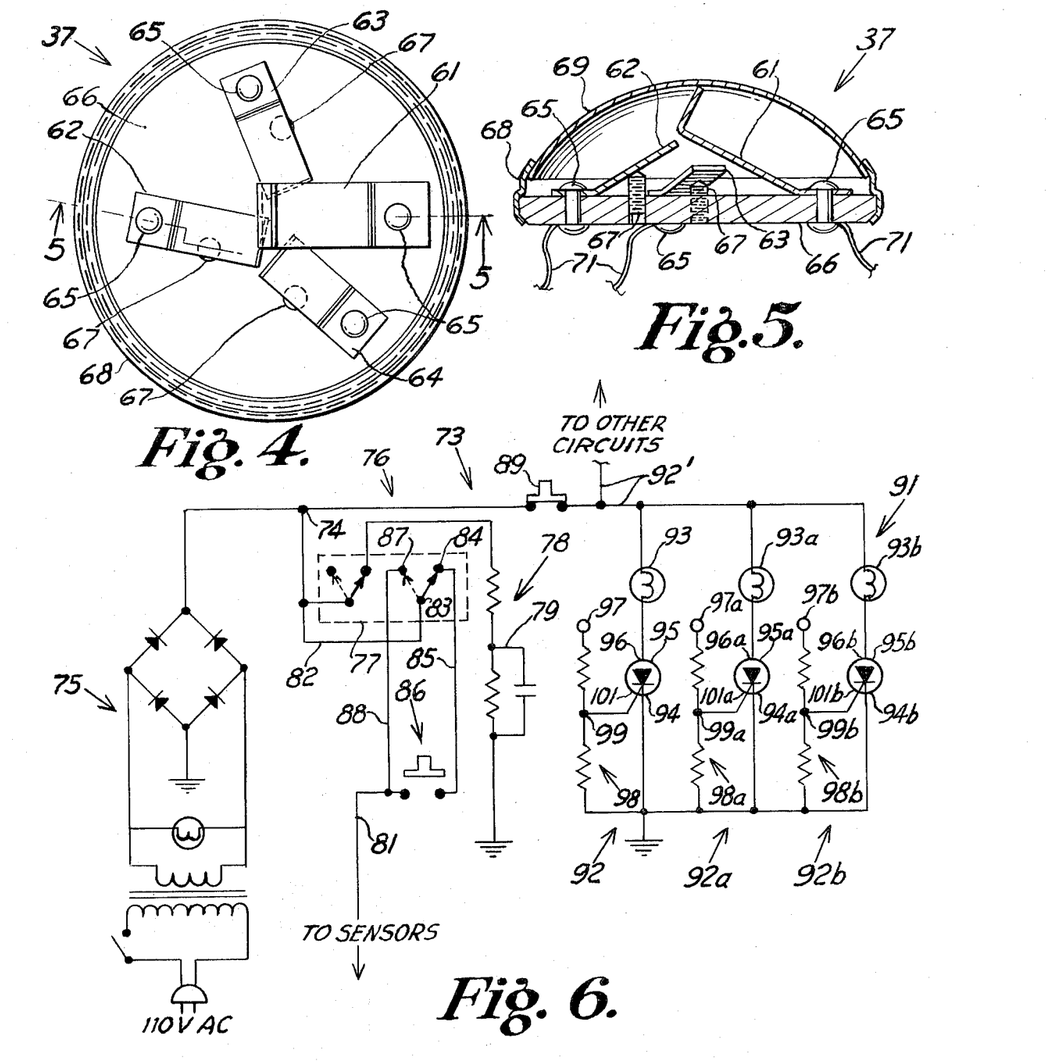
FIG. 4 shows a sectioned plan view of a progressive contact sensor with a spherical cap removed.
FIG. 5 shows a sectioned elevation view of the progressive contact sensor shown in FIG. 4.
FIG. 6 is a schematic diagram of the analyzer utilized with the sensor shown in FIGS. 4 and 5.

Referring now to FIGS. 4 and 5, there is shown in detail a progressive contact sensor 37. A common contact 61 and three progressive contacts 62, 63 and 64 are fastened by rivets 65 to a plastic base 66. Three adjusting screws 67 adjust the progressive contacts 62, 63 and 64 to different angles with respect to the base 66. A retaining ring 68 holds a spherical cap 69 in place as shown in FIG. 5. In order to preserve clarity the spherical cap 69 is not shown in FIG. 4. As progressively more force is applied to the spherical cap 69 the common contact 61 is forced downward as shown in FIG. 5, sequentially contacting the progressive contacts 62, 63 and 64 as greater loads are sensed. The calibration screws 67 can be used to adjust the progressive contacts 62, 63 and 64 to respond to different magnitude ranges. An example of typical magnitude ranges used in practice is 1/2 to 1 pound of force for a low range that causes the common contact 61 to engage the progressive contact 62, and 1 to 1½ pounds for a medium range that activates the progressive contact 63, and greater than 1½ pounds for a high range that causes engagement of the progressive contact 64. Wire leads 71 are connected to the rivets 65.

Referring now to FIG. 6, there is shown a diagram of an analyzer circuit 73 that is part of the analyzer 23. Unfiltered d.c. power is supplied to a terminal 74 by a conventional full wave bridge rectifier circuit 75. Connected to the terminal 74 is a dynamic circuit 76 comprising a mode switch 77 that selectively connects a memory filter circuit 78 consisting of a conventional capacitative filter 79. When the mode switch 77 is in the memory position, as shown by the solid lines in FIG. 6, the filter 79 is connected to the terminal 74. The filtered d.c. provided passes through a line 82 and switch contacts 83 and 84 to a line 85. Only when a read switch 86 is depressed does the filtered d.c. on the line 85 appear on a common buss 81. The common buss 81 is connected to the common contact of each sensor, that is, the contact 61 a shown in FIGS. 4 and 5. When the mode switch 77 is in the continuous or dynamic mode, as shown by the broken line in FIG. 6, the capacitative filter 79 is disconnected from the terminal 74, and the unfiltered pulsating d.c. passes through the line 82 and the contact 83 to a contact 87 and through a line 88 to the common buss 81. Therefore, when the mode switch 77 is in the continuous position the common contacts 61 of the sensors 37 are continuously supplied pulsating d.c. The power available at the terminal 74, whether pulsating or filtered, is also passed to a plurality of peak indicator circuits by a normally closed clear switch 89. Each of the sensors 37 is associated with a peak indicator circuit, but to preserve clarity only one such circuit 91 is shown. The unshown circuits receive power through a common buss bar 92' and are identical with the circuit 91. The circuit 91 includes three lamp control circuits 92, 92a and 92b, each selectively energizes an associated indicator lamp 93, 93a and 93b. Each lamp controlling circuit 92, 92a or 92b is similar, therefore only the controlling circuit 92 will be described. The components included in the circuits 92a and 92b will be numbered similarly to those included in the circuit 92 except that the components in the circuit 92a will be identified by the suffix a and those in the circuit 92b will be identified by the suffix b on FIG. 6. A cathode 94 of a silicon controlled rectifier 95 is grounded, and an anode 96 thereof is connected to the buss 92' through the lamp 93. An input terminal 97 is connected to a resistive voltage divider 98, and an output 99 thereof is connected to a gate 101 of the silicon controlled rectifier 95. The inputs 97, 97a and 97b are connected to the progressive contacts of the associated sensor 37. For example, the input 97 is connected to the contact 62 as shown in FIGS. 4 and 5 and the input 97a is connected to the contact 63 and the input 97b is connected to the contact 64. The lamps 93, 93a and 93b may be clustered together to indicate the output of an individual sensor 37 and are distinguished from one another by color. For example, the lamp 93 is green, the lamp 93a is amber or yellow, and the lamp 93b is red.

During operation of the embodiment 21 shown in FIGS. 1, 2, 4, 5 and 6 the test subject 20 dons one or all of the sensor garments 24, 25 and 26 and then the object, that is to exert a force onto the body of the test subject is positioned. That is, he may don clothing or be seated in a chair, for example. Static or dynamic pressure against the body of the test subject 20 will activate some of the sensors 37 and those activations will change as the test subject goes through the motions associated with his normal activities. Since all sensor and indicator combinations operate identically only one sensor 37 and its associated indicator, the circuit 91, will be described. All the sensors 37 and all of the sensor garments 24, 25 and 26 operate similarly. Furthermore, the three-dimensional mannequin 22 shown in FIG. 1 need not be used and the display 49 shown in FIG. 3 may be substituted therefore with no change in circuitry or operation.

Attention is directed to FIGS. 4, 5 and 6. Initially the power supply 75 is turned on and the mode switch 77 is placed in the memory mode, as shown by the solid lines in FIG. 6. Filtered d.c. is supplied to the buss 92. When the read switch 86 is depressed filtered d.c. is also supplied to the common contacts 61 by the line 81. As described previously, if there is less than 1/2 pound of force exerted on the spherical cap 69 no contact 62, 63 or 64 in the sensor 37 will be engaged, but if there is more than 1/2 pound of force the progressive contact 62 will be engaged by the common contact 61. Similarly, if there is more than 1 pound of force the cap 69 moves downward and the progressive contact 63 will be engaged. If there is more than 1½ pounds of force the progressive contact 64 will be engaged. For example, assume 3/4 of a pound is exerted on the spherical cap 69. Then, only the progressive contact 62 is engaged by the common contact 61 and the filtered d.c. from line 81 is passed to the input 97. A voltage appears at the output 99 and the gate 101 thereby turning on the silicon controlled rectifier 95. Since the silicon controlled rectifier 95 is conducting the lamp 93 lights. The other silicon controlled rectifiers 95a and 95b do not conduct since there is no signal at the inputs 97a and 97b. If the read switch 86 is released the circuit 91 will remain in a steady state until the clear switch 89 is opened removing power from the common buss 92 and extinguishing the light 93. Until the clear switch 89 is opened, the circuit 91 will "remember" the pressure sensed by the sensor 37. Since the lamp control circuits 92, 92a and 92b are independent of each other, more than one light 93, 93a or 93b may be on at one time. The highest pressure sensed by the sensor 37 during a given test is indicated by the lighted lamp 93, 93a or 93b that indicates the highest pressure.

When the read switch 86 is held closed for a prolonged period of time, operation is substantially as described above and each lamp 93, 93a and 93b once lighted will remain so until the clear switch 89 is depressed. The highest pressure indicated by the lamp or lamps 93, 93a or 93b lighted indicates the peak pressure sensed during the given test, that is, the time during which the read switch 86 was closed. After a reading is taken the clear switch 89 is used to clear the circuit 91 as described above.

For a continuous monitoring of the load profile the mode switch 77 is set to the continuous position as shown by the dotted lines in FIG. 6 and then a pulsating d.c. is supplied by the line 81 to the common contacts 61 regardless of the position of the read switch 86. Operation is similar to that described above, except that the voltage at the terminal 74 drops to zero 120 times per second, and any lighted lamps 93, 93a or 93b are extinguished when the voltage falls to zero. As the voltage rises, the lamps 93, 93a or 93b will light again if the proper pressure is still sensed by the sensor 37. But if conditions have changed and the pressure is no longer on the sensor 37 the lamps will not light. A continuous monitoring of pressures sensed during the motions of the test subject 20 is therefore obtained. For example, if the test subject 20 raises his right arm as shown in FIG. 1, the changes in pressure in the vicinity of the right shoulder are displayed immediately.

Figure 7:
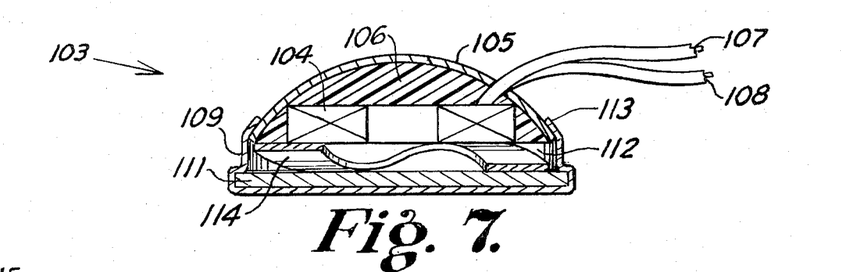
FIG. 7 is a sectioned elevation view of a variable inductance sensor.

Referring next to FIG. 7, there is shown a sectioned elevation view of a variable inductance sensor 103 including a coil 104 that is held in a spherical cap 105 by an epoxy filling 106 and is connected to an analyzer (described below) by leads 107 and 108. An outer ring 109 retains an aluminum disc 111 and encloses a cylindrical area 112 in which the cap 105 and coil 104 may move vertically with respect to the aluminum disc (as viewed in FIG. 7). The upper limit of vertical motion permitted the coil is defined by a lip 113 of the outer ring 109. The coil 104 is held in the upper most position, that is furthest from an aluminum disc 111, by a wave washer spring 114. The inductance of the coil 104 is partially determined by the proximity of the aluminum disc 111 and as pressure is applied to the cap 105 the wave washer 114 is flatened, and the coil is forced toward the disc. Therefore, as pressure is applied to the sensor 103 the inductance between the leads 107 and 108 changes.

Figure 8:
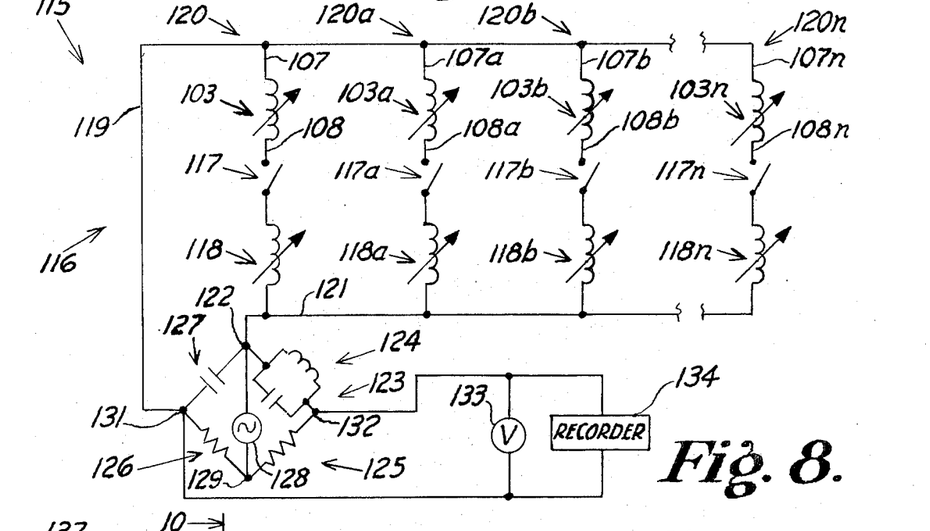
FIG. 8 is a diagram of the analyzer circuitry used with the variable inductance sensor shown in FIG. 7.

Referring now to FIG. 8 there is shown a diagram of an analyzer 116 that is used in an alternate embodiment 115 of the invention in conjunction with the sensor 103. The sensor 103 is in series with a switch 117 and a variable calibration inductor 118. Other similar sensors 103a, 103b...103n are connected to similar switches and inductors 117a, 117b...117n and 118a, 118b...118n respectively. A plurality of sensing circuits 120–120n, each comprised of a sensor 103–103n, a switch 117–117n and an inductor 118–118n are connected in parallel to two common lines 119 and 121. The line 121 is connected to an upper terminal 122 of a bridge circuit 123 that includes in the upper right branch a tuned circuit 124 and equal resistors 125, 126 in the lower branches. The upper left branch includes capacitor 127 that is shunted by the series circuits 120–120n on the lines 119 and 121. Therefore if any of the switches 117–117n is depressed a tuned circuit is formed including a sensor 103–103n, a calibration inductance 118–118n and the capacitor 127. An a.c. generator 128 is connected between the upper terminal 122 of the bridge 123 and a lower terminal 129 of the bridge. The output of the bridge 123 between a left terminal 131 and a right terminal 132 is connected to an a.c. volt meter 133 in parallel with a strip chart recorder 134.

During use of the embodiment 115 a sensing garment similar to those shown in FIG. 1 is made comprising a plurality of sensors 103. The sensing garment (not shown) is donned by the test subject and after sufficient time for the temperature to stabilize, the switch 117 is depressed thereby forming a tuned circuit in the upper left portion of the bridge 123. If the bridge 123 is balanced, that is, if the impedance of the tuned circuit formed between the terminals 122 and 131 is equal to impedance of the tuned circuit 124 no output appears on the volt meter 128. If an output appears the calibration inductance 118 is adjusted until the output is zero. The switch 117 is then opened and switch 117a is closed and the procedure is repeated. When all the calibration coils 118–118n have been calibrated, testing may begin. The test subject and the article to be tested are then put in contact and the switch 117 is closed and any pressure exerted on the sensor 103 causes a decrease in the inductance of the sensor and a corresponding decrease in the impedance between the terminals 122 and 131. Therefore the bridge 123 becomes unbalanced and an output appears between the terminals 131 and 132. This output is read directly on the volt meter 133, which is calibrated in terms of pressure, or the output is recorded with the recorder 134 or both. When the pressure exerted on sensor 103 is analyzed the switch 117 is opened and then 117a is closed and the above procedure is repeated with the sensor 103a, and so on for all the sensors through 103n. When simultaneous readout is desired a septate bridge 123 and volt meter 133 or recorder 134 is provided for each sensor 103–103n.

Figure 9:
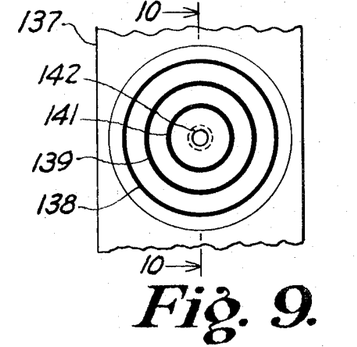
FIG. 9 shows a portion of a plastic flexible circuit used with replaceable sensors.
Figure 10:
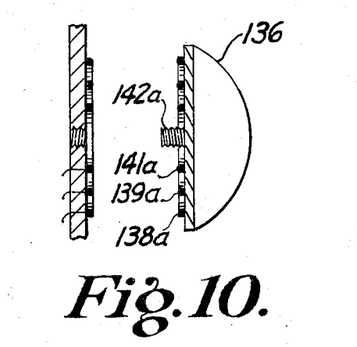
FIG. 10 shows a section of that portion of plastic circuit shown in FIG. 9 and a replaceable progressive contact sensor.

Referring now to FIGS. 9 and 10 there is shown a replaceable sensor 136 and a portion of a flexible circuit strip 137 similar to that denoted by number 39 in FIG. 2. The circuit strip 137 includes a plurality of annular contacts 138, 139 and 141 and a threaded contact 142. The sensor 136 includes mating annular contacts 138a, 139a, 141a and a threaded center stud contact 142a.

The sensor 136 is of the progressive contact type as shown in FIGS. 4 and 5 and is used with the analyzer 23, as shown in FIG. 1. The variable inductance sensor can also be made in replaceable form. When a sensor 136 is damaged no connection need be soldered. The damaged sensor 136 is removed by a simple screwing motion and a new sensor is installed. Also the sensitivity range of a given support matrix can be altered by merely substituting sensors with desired characteristics.

Figure 11:
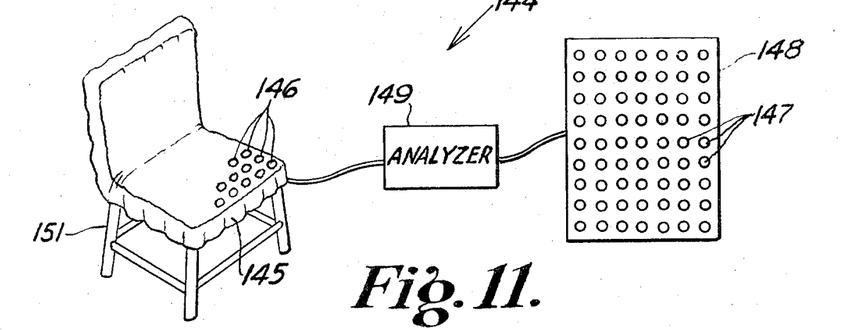
FIG. 11 shows another preferred embodiment of the invention.

Referring now to FIG. 11 there is shown another preferred embodiment 144 of the invention including a flexible support sheet 145 with a plurality of sensors 146 disposed thereon. To preserve clarity only a few of the sensors 146 are shown. The sensors 146 are disposed in a fixed matrix on the support 145 and corresponding indicators 147 are disposed in a fixed matrix on a rectangular display 148. Each indicator 147 is disposed in the position on the display 148 that corresponding sensor 146 occupies on the flexible support 145. The sensors 146 and the indicators 147 are connected to an analyzer 149. The sensors 146, the analyzer 149 and the indicators 147 are similar to those employed in the embodiment 21. The support sheet 145 is shown placed over a chair 151.

The embodiment 144 is utilized when one desires a load profile of pressures exerted on the body of a test subject by self supported articles such as furniture pieces, automobile or aircraft seats, etc. The flexible support 145 is placed over the chair 151, and when the text subject is seated on the chair the load profile is shown by the indicators 147 on the display 148 and any improper or uneven pressure distribution will be immediately evident. The information derived can then be used to redesign the shape of the chain and/or modify structural materials therein so as to provide a product that creates a more desirable distribution of pressure on the body of an occupant.

Figure 12:
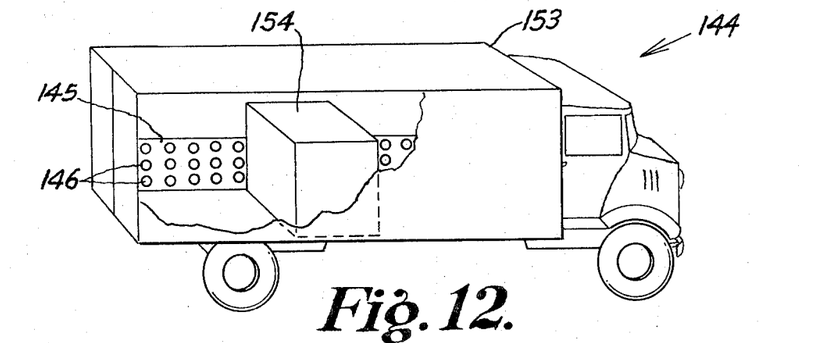
FIG. 12 shows another use of the embodiment shown in FIG. 11.

Referring now to FIG. 12 there is shown another preferred use of the embodiment 144. The test subject is a truck 153 and the sheet 145 is suspended around the inside of the body of the truck. The analyzer 149 and the display 143 (not shown) are within the cab of the truck. When the truck 153 is loaded, as with a large box 154, the operator can monitor critical load distributions, or watch for load shifting by observing the lights 147 on the display 148. It will be obvious that other carriers such as ships and aircraft can make use of this embodiment 144.

Figure 13:
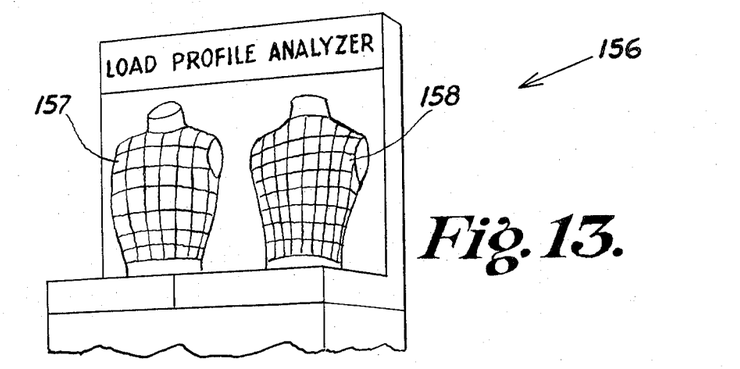
FIG. 13 shows an alternate display for use with the embodiment shown in FIG. 1.

Referring next to FIG. 13 there is shown an alternate embodiment of a display 156 that comprises separate front and back sub-displays 157 and 158 respectively. Indicators (not shown) are on the sub-displays 157 and 158. The embodiment 156 permits simultaneous observation of both the front and back of a test subject. The other embodiments mentioned above, for example the mannequin 22, permit observation of only one side of th body at a time.

Obviously, many modifications and variations of the present invention are possible in light of the above teachings. It is to be understood, therefore, that the invention can be practiced otherwise than as specifically described.

What is claimed is:

1. A load profile analyzer for determining the distribution of forces on a test body produced by the loading effect of a body covering and comprising:

a. a plurality of electrically operated pressure sensors for simultaneously producing distinguishable output signals in response to different load magnitudes exerted on the test body;

b. a flexible support sheet means for supporting said pressure sensors between the test body and the body covering, said sensors being in mechanical contact with the test body and each sensor being responsive only to the pressure exerted on the discrete portion of the body adjacent thereto, said flexible support sheet means being adapted to freely assume the surface contour of any irregularly contoured surface on which it is supported and to produce substantially no alteration in the distribution of forces transmitted by the body covering to the test body; and c. an analyzer means operatively connected to said pressure sensors and adapted to analyze and indicate the pressures sensed by said pressure sensors.

2. A load profile analyzer according to claim 1 wherein said analyzer means comprises a plurality of separate indicators, each operatively associated with one of said plurality of sensors.

3. A load profile analyzer according to claim 2 wherein said analyzer means comprises a dynamic means adapted to operate continuously and indicate any change in pressure occurring as the test body changes position.

4. A load profile analyzer according to claim 3 wherein said indicators comprise recording means for recording the indications produced over a period of time.

5. A load profile analyzer according to claim 3 wherein said analyzer means also comprises a memory means for retaining the indications produced by a given set of sensed pressures.

6. A load profile analyzer according to claim 2 wherein said indicators comprise peaking means to indicate the maximum pressure sensed during a given dynamic test.

7. A load profile analyzer according to claim 1 wherein said support sheet means comprises a suspension means for suspending said sensors.

8. A load profile analyzer according to claim 1 wherein said support sheet means comprises a stretchable liner means for supporting said sensors and permitting said sensors to move with respect to each other.

9. A load profile analyzer according to claim 8 wherein said support sheet means comprises flexible circuit means for making electrical connections to said sensors.

10. A load profile analyzer according to claim 1 wherein said support sheet means comprises a stretchable envelope means for covering and protecting said sensors.

11. A load profile analyzer according to claim 1 wherein said analyzer means comprises a plurality of separate indicators each operatively associated with one of said sensors, and display means to simulate the portion of the test body being tested.

12. A load profile analyzer according to claim 1 wherein said sensors are progressive contact switches.

13. A load profile analyzer according to claim 1 wherein said sensors comprise variable inductance coils.

14. A load profile analyzer according to claim 1 wherein said sensors are replaceable 15. A load profile analyzer according to claim 1 wherein the test body is a portion of a human wearer of the body covering and said analyzer means comprises a plurality of separate indicators, each operatively associated with one of said sensors.

16. A load profile analyzer according to claim 15 wherein said support sheet means is in the form of a vest and said analyzer means indicates the pressures exerted on the torso of the wearer.

17. A load profile analyzer according to claim 16 wherein said analyzer means comprises a mannequin with said plurality of indicators disposed theron, each of said indicators disposed in the position on said mannequin that corresponds to the position occupied by the associated one of said plurality of sensors on the torso of the wearer.

18. A load profile analyzer according to claim 15 wherein said support sheet means is in the form of a stocking and said analyzer means indicates the pressures exerted on the foot of the wearer.

19. A load profile analyzer according to claim 18 wherein a said analyzer means comprises a model of a human foot with said plurality of indicators disposed thereon, each of said indicators disposed in the position on said model that corresponds to the position occupied by the associated one of said plurality of sensors on the foot of the wearer.

20. A load profile analyzer according to claim 15 wherein said support sheet means is in the form of a skull cap and said analyzer means indicates the pressures exerted on the head of the wearer.

21. A load profile analyzer according to claim 20 wherein said analyzer means comprises a model of a human head with said plurality of indicators disposed thereon, each of said indicators disposed in the position on said model that corresponds to the position occupied by the associated one of said plurality of sensors on the head of the wearer.

* * * * *